United States Patent
Nakakubo et al.

(10) Patent No.: US 7,592,087 B2
(45) Date of Patent: Sep. 22, 2009

(54) FUEL CELL AND ELECTRIC APPARATUS

(75) Inventors: Toru Nakakubo, Kanagawa (JP); Ken Eguchi, Kanagawa (JP); Mitsuhiro Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 10/499,879

(22) PCT Filed: Jun. 27, 2002

(86) PCT No.: PCT/JP02/06514

§ 371 (c)(1),
(2), (4) Date: Jun. 24, 2004

(87) PCT Pub. No.: WO03/058741

PCT Pub. Date: Jul. 17, 2003

(65) Prior Publication Data

US 2005/0019639 A1    Jan. 27, 2005

(30) Foreign Application Priority Data

Dec. 28, 2001  (JP) .............. 2001-399695
Dec. 28, 2001  (JP) .............. 2001-399696

(51) Int. Cl.
*H01M 2/00*  (2006.01)
*H01M 2/02*  (2006.01)
*H01M 2/14*  (2006.01)
*H01M 8/00*  (2006.01)
*H01M 8/18*  (2006.01)

(52) U.S. Cl. .............. 429/34; 429/20; 429/38; 429/39

(58) Field of Classification Search .............. None
See application file for complete search history.

(56) References Cited

U.S. PATENT DOCUMENTS 3,799,811 A * 3/1974 Chottiner et al. .............. 429/42

(Continued)

FOREIGN PATENT DOCUMENTS

JP    5-283094    10/1993

(Continued)

OTHER PUBLICATIONS

Machine Translation of Patent Abstracts of Japan 11-045733, Feb. 16, 1999.*

(Continued)

*Primary Examiner*—Robert Hodge
(74) *Attorney, Agent, or Firm*—Fitzpatrick, Cella, Harper & Scinto

(57) ABSTRACT

A fuel cell system is provided which has a humidifying means (2) for directly humidifying a polymer electrolyte membrane (12) that serves as an ionic conductor. As the humidifying means (2), means is employed which has a water holding unit (21) comprised of a water-absorbing material and located in contact with the polymer electrolyte membrane to directly humidify the polymer electrolyte membrane (12) by utilizing a capillary action and further has a humidification water passage (28) comprised of a hydrophilic material and provided in the polymer electrolyte membrane so as to be connected to the water holding unit (21) to humidify the polymer electrolyte membrane (12) rapidly and uniformly. Such a constitution provides a fuel cell system that can directly humidify an ionic conductor.

22 Claims, 12 Drawing Sheets

U.S. PATENT DOCUMENTS 4,840,823 A * 6/1989 Chigami et al. ............ 428/35.5

FOREIGN PATENT DOCUMENTS

| JP | 8-306375 | 11/1996 |
| JP | 11-45733 | 2/1999 |
| JP | 2000-294260 | 10/2000 |
| JP | 2000-340247 | 12/2000 |
| JP | 2001-93539 | 4/2001 |
| JP | 2001-102059 | 4/2001 |
| JP | 2001-160406 | 6/2001 |

OTHER PUBLICATIONS

Official English Translation of JP 11-045733, Feb. 16, 1999.*
Official English Translation of Patent Abstracts of Japan 11-045733, Feb. 16, 1999.*

* cited by examiner

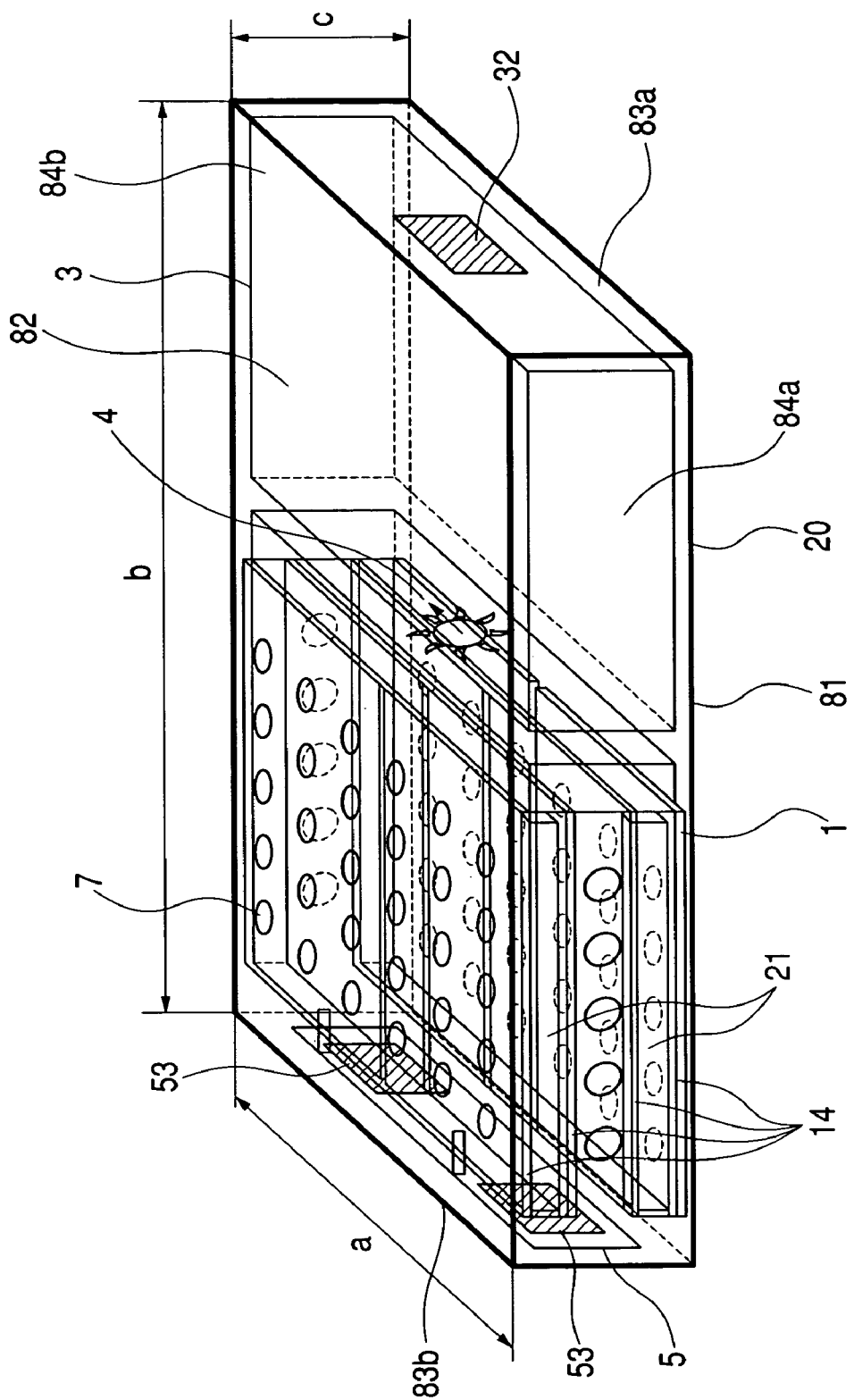

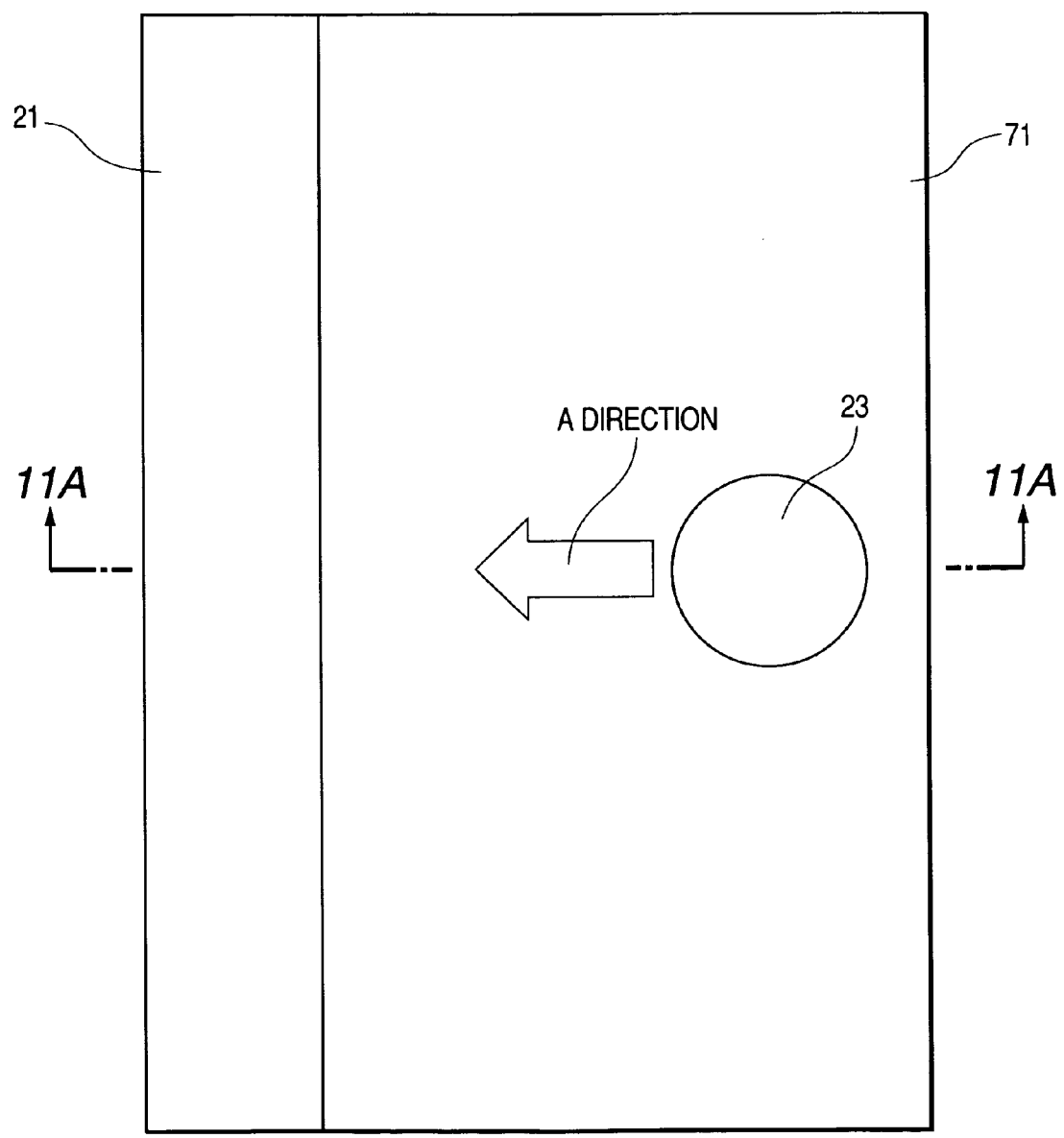

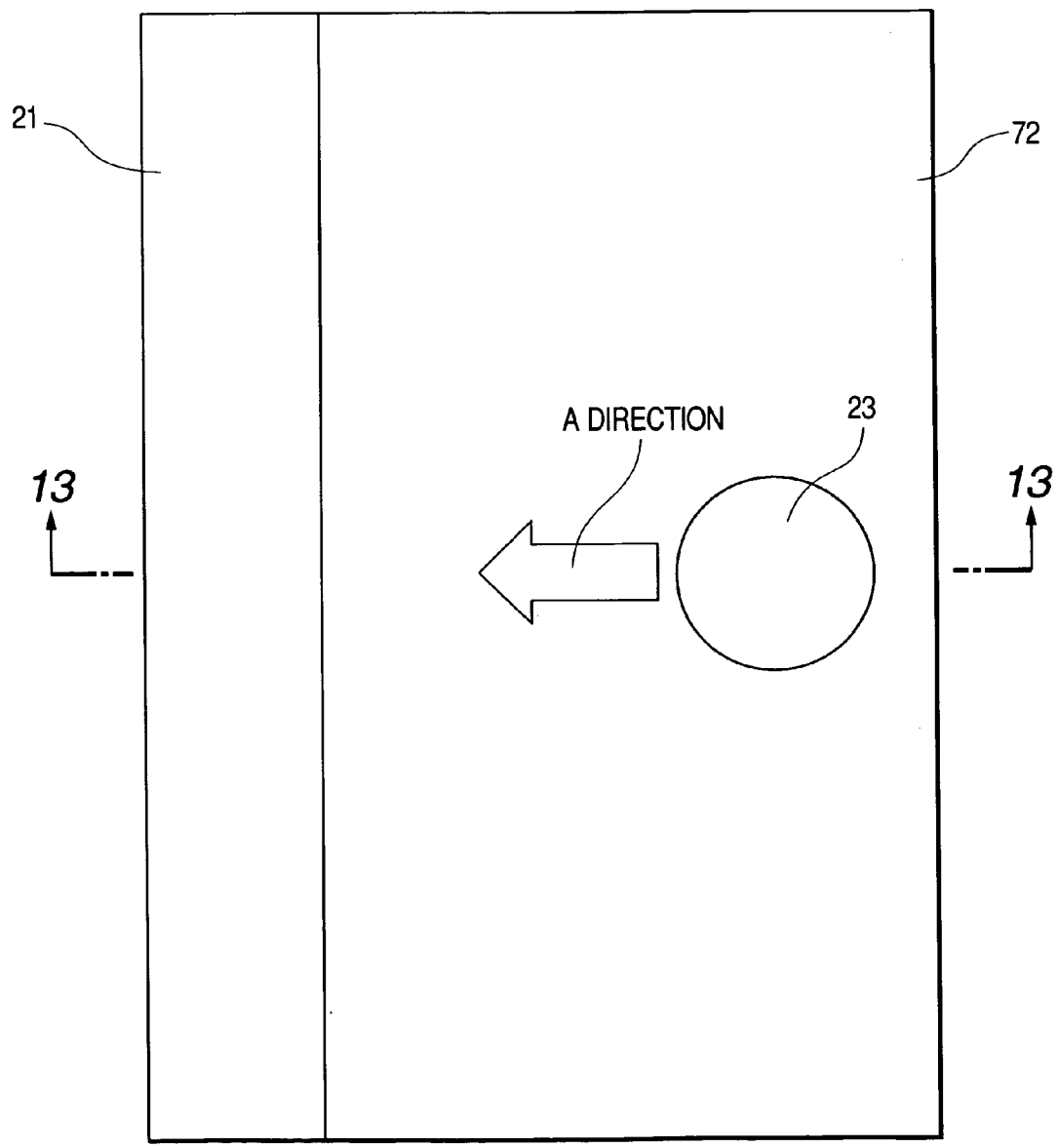

_US 7,592,087 B2_

FUEL CELL AND ELECTRIC APPARATUS

TECHNICAL FIELD

The present invention relates to a fuel cell system and an electric equipment.

BACKGROUND ART

Conventionally, a variety of primary and secondary batteries have been used in portable compact electric equipment. However, due to recent improvements in performance of such equipment, power consumption has become greater, making it difficult to provide a primary battery that can supply sufficient energy while being compact and lightweight. Although a secondary battery has the advantage that it can be repeatedly recharged and used, the amount of energy that is usable in a single charging is even less than that of a primary battery. Further, recharging a secondary battery requires a separate power source and generally takes several tens of minutes to several hours, so that it is difficult to use a secondary battery at once at any time and in any location. Although it is expected that in the future the electric equipment will become even smaller and lighter and the wireless network environment is being developed, increasing the tendency of using portable equipment, it will be difficult for conventional primary and secondary batteries to supply sufficient energy for driving equipment.

As a solution to such problems, compact fuel cell systems are drawing attention. Fuel cell systems have hitherto been developed as a driving source for large generators and automobiles. The major reason for this is that a fuel cell system has a higher power generation efficiency and produces clean wastes, as compared with conventional power generation system. A fuel cell system is also useful as a driving source for compact electric equipment, because the amount of energy that a unit volume or weight of a fuel cell can supply is several to nearly ten times that of a conventional battery. Further, because a fuel cell system can operate continuously only by refilling or exchanging fuel, recharging thereof does not take much time unlike other secondary batteries.

While various types of fuel cell systems have been developed, for compact electric equipment, especially mobile equipment, polymer electrolyte fuel cell systems, for example, are suitable. This is because these systems have the advantages of being usable at a temperature close to ordinary temperature and being safe to carry around since the electrolyte is not a liquid, but is a solid.

While fuel cell systems are based on the simple principle of generating power by supplying fuel and an oxidizer to a fuel cell, in order to achieve optimum power generation, a number of controls are carried out.

A fuel cell in a polymer electrolyte fuel cell system is structured such that a polymer electrolyte membrane, which serves as an ionic conductor, is sandwiched and held by a fuel electrode and an oxidizer electrode having catalyst layers. The polymer electrolyte membrane contains water in its interior, acting to conduct hydrogen ions (protons) and also to prevent cross-leaking between the fuel gas and the oxidizer gas. However, the ionic conductivity, which determines the performance of a polymer electrolyte fuel cell system, is greatly affected by the wettability of the polymer electrolyte membrane. In particular, the conductivity dramatically drops due to drying of the polymer electrolyte membrane, so that an increase in the internal resistance will considerably degrade the characteristics of the fuel cell system.

Therefore, power generation for a polymer electrolyte fuel cell system requires the polymer electrolyte membrane to be suitably moist for effective ionic conduction. As disclosed in Japanese Patent Application Laid-Open Nos. 2001-102059 and H08-306375, a conventional method humidifies a polymer membrane by moistening the fuel beforehand. Further, as disclosed in Japanese Patent Application Laid-Open Nos. 2001-102059 and H11-045733, another method uses water obtained as a result of power generation to moisten the fuel.

However, in fuel cell system constructions such as described above, when the fuel cell system is large, methods that are used to humidify the fuel gas with water produced during power generation require a pump for transporting the generated water, because the fuel cell is distant from the fuel supply unit. When a pump is used, power has to be supplied to the fuel cell system, so that such a system has the disadvantages of being larger and more complex.

Even for small fuel cell systems, when water generated in an oxidizer electrode is supplied to a fuel passage on a fuel electrode side, it is difficult to prevent the oxidizer from mixing with the fuel.

In addition, in polymer electrolyte fuel cell systems, hydrogen ions that have passed through a polymer electrolyte membrane serving as an ionic conductor react at an oxidizer electrode with an oxidizer (oxygen), thereby generating water at the surface of the oxidizer electrode. Because an oxidizer passage at the oxidizer electrode is narrow, unless the generated water is removed the passage is closed off by water droplets, whereby the oxidizer cannot be efficiently led to the oxidizer electrode. To prevent this, Japanese Patent Application Laid-Open Nos. 2001-102059 and 2001-160406 disclose that by using a conductive, water-repellant porous material for the oxidizer electrode, the oxidizer electrode can be prevented from becoming excessively wet. In addition, Japanese Patent Application Laid-Open No. 2001-93539 discloses that by applying a hydrophilic coating to the surface of a separator that forms a gas passage, the passage can be prevented from being closed off by generated water.

However, in these methods it was difficult to quickly remove water generated in an oxidizer electrode. These methods also suffered from the problem that when an attempt was made to lead the generated water in a certain direction, an apparatus using an electric power such as a pump or blower was required, thus enlarging the system. For this reason, it was also difficult to store the used water in a given place.

DISCLOSURE OF THE INVENTION

It is an object of the present invention to resolve these problems individually or collectively.

That is, in order to humidify an ionic conductor, it is an object of the present invention to provide a novel fuel cell system that can directly humidify a polymer electrolyte membrane using a simplified system that does not employ an apparatus such as a pump that serves to moisten a fuel in the above-described methods. It is also an object of the present invention to provide a fuel cell system that can eliminate water generated in an oxidizer electrode without using an apparatus such as a pump, and to provide an electric equipment that uses these fuel cell systems.

A first aspect of the present invention for achieving these objects is a fuel cell system having a humidifying means for directly humidifying a fuel cell polymer electrolyte membrane, which comprises a fuel cell unit comprising an oxidizer electrode, a fuel electrode and a polymer electrolyte membrane provided between the oxidizer electrode and the fuel electrode; a water holding unit comprised of a water-absorbing material provided in contact with the oxidizer electrode and the polymer electrolyte membrane; and a humidification water passage connected to the water holding unit and provided in the polymer electrolyte membrane, wherein a water held in the water holding unit is directly supplied to the polymer electrolyte membrane through the water holding unit and the humidification water passage.

In the present invention, it is preferable that the humidification water passage has a flat plate shape and is provided parallel to the oxidizer electrode.

Further, it is preferable that the humidification water passage has a linear shape and is provided parallel to the oxidizer electrode.

Moreover, it is preferable that the humidification water passage has a retiform shape.

Further, it is preferable that the humidification water passage has a vein shape.

Moreover, it is preferable that the humidification water passage is hydrophilic.

Further, it is preferable that the humidification water passage has an ionic conductivity.

Moreover, it is preferable that the water held in the water holding unit is supplied to the humidification water passage.

Further, it is preferable that the water held in the water holding unit directly humidifies the polymer electrolyte membrane by a capillary action.

Moreover, it is preferable that the water contained in the humidification water passage directly humidifies the polymer electrolyte membrane by a capillary action.

Further, it is preferable that the water holding unit stores water generated in the oxidizer electrode.

A second aspect of the present invention for achieving the above objects is a fuel cell system comprising a fuel cell unit comprising an oxidizer electrode, a fuel electrode and an ionic conductor provided between the oxidizer electrode and the fuel electrode; and means for moving water generated in the oxidizer electrode provided on a surface of the oxidizer electrode.

In the present invention, it is preferable that the means for moving water comprises a water-moving pattern comprising a hydrophobic region and a hydrophilic region on the surface of the oxidizer electrode, and water generated in the oxidizer electrode is moved by the water-moving pattern to be eliminated.

Further, it is preferable that one of the hydrophobic region and the hydrophilic region comprises a tapered region and the other comprises an oppositely tapered region, and the tapered region and the oppositely tapered region are arranged alternatively.

Moreover, it is preferable that the hydrophobic region is provided so as to have a larger surface area on one side of a surface of the oxidizer electrode, while the hydrophilic region is provided so as to have a larger surface area on the other side of the surface of the oxidizer electrode, and water generated in the oxidizer electrode is moved from the one side to the other side to be removed.

Further, it is preferable that the means for moving water comprises a hydrophilic porous layer and the surface area thereof gradually becomes greater in a direction in which water generated in the oxidizer electrode is to be moved.

Moreover, it is preferable that the pore diameter of a porous material of the porous layer gradually becomes smaller in a direction in which water generated in the oxidizer electrode is moved and the pore density thereof gradually becomes greater in that direction.

Further, it is preferable that the pore diameter of a porous material of the porous layer is uniform, and the pore density thereof gradually becomes greater in a direction in which water generated in the oxidizer electrode is to be moved.

Moreover, it is preferable that the pore diameter of a porous material of the porous layer gradually becomes greater in a direction in which water generated in the oxidizer electrode is to be moved and the pore density thereof is uniform.

Further, it is preferable that the thickness of the porous layer gradually becomes greater in a direction in which water generated in the oxidizer electrode is to be moved.

Moreover, it is preferable that the means for moving water comprises a hydrophobic porous layer and the surface area thereof gradually becomes smaller in a direction in which water generated in the oxidizer electrode is to be moved.

Further, it is preferable that the pore diameter of a porous material of the porous layer gradually becomes greater in a direction in which water generated in the oxidizer electrode is to be moved and the pore density thereof gradually becomes smaller in that direction.

Moreover, it is preferable that the pore diameter of a porous material of the porous layer is uniform and the pore density thereof gradually becomes smaller in a direction in which water generated in the oxidizer electrode is to be moved.

Further, it is preferable that the pore diameter of a porous material of the porous layer gradually becomes smaller in a direction in which water generated in the oxidizer electrode is to be moved and the pore density is uniform.

Moreover, it is preferable that the thickness of the porous layer gradually becomes smaller in a direction in which water generated in the oxidizer electrode is to be moved.

Further, it is preferable that a water holding unit for storing water moved by the means for moving water is provided adjacent to the oxidizer electrode.

Moreover, it is preferable that the water holding unit is provided on a side surface of the fuel cell unit.

Further, it is preferable that the ionic conductor is a polymer electrolyte membrane.

Moreover, it is preferable that the fuel cell system is a polymer electrolyte fuel cell system.

Further, it is preferable that the fuel cell system is a polymer electrolyte small fuel cell system.

A third aspect of the present invention is an electric equipment that employs the above-mentioned fuel cell system.

Other characteristics and effects of the present invention will be described in detail in the following while referring to the drawings.

BRIEF DESCRIPTION OF THE DRAWINGS

FIG. 1 is a perspective view illustrating one example of a fuel cell system according to the present invention;

FIG. 10 is a plan view of a cell unit having a porous layer on a surface of an oxidizer electrode in which the pore diameter gradually becomes smaller in A-direction;

FIG. 12 is a plan view of a cell unit having a porous layer on a surface of an oxidizer electrode in which the thickness of the porous layer gradually becomes greater in A-direction;

BEST MODE FOR CARRYING OUT THE INVENTION

Figure 2A:
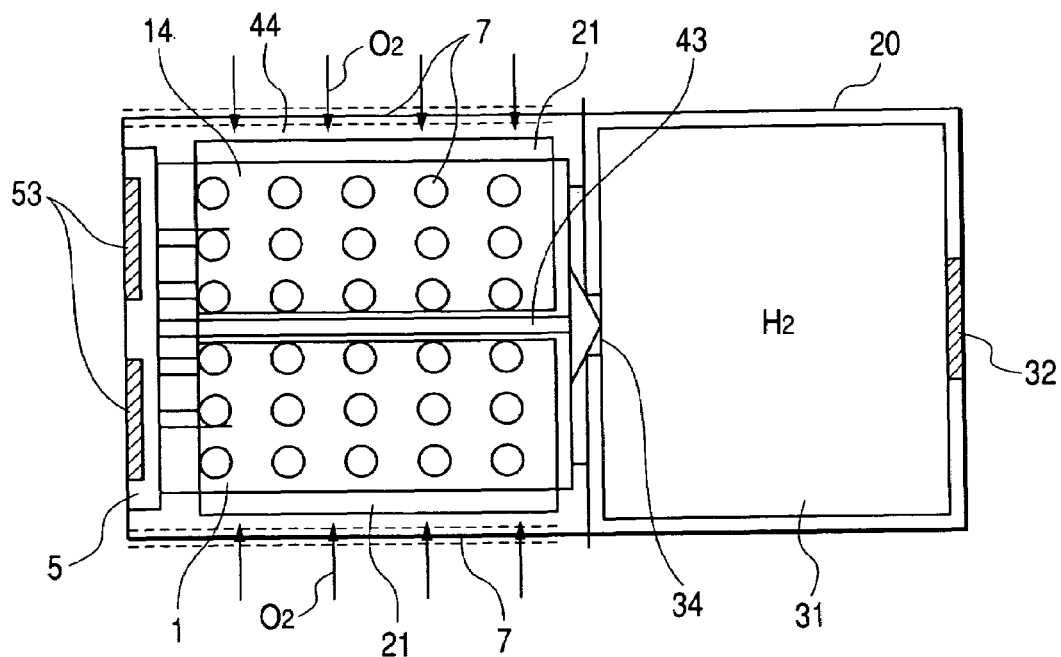
FIG. 2A is a plan view of a fuel cell system of FIG. 1.

Preferable embodiments of the present invention will be explained in the following while referring to the drawings.

First Embodiment

A fuel cell system according to a first embodiment of the present invention does not humidify a fuel, but has a humidifying means for directly humidifying a polymer electrolyte membrane.

Figure 6:
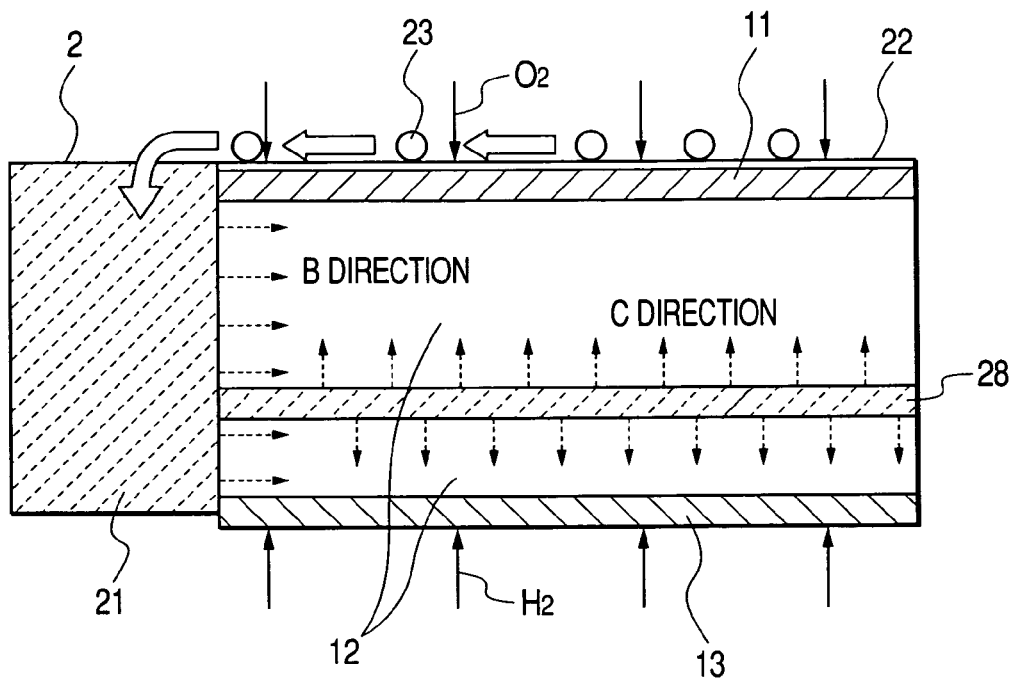
FIG. 6 is a schematic cross-sectional view showing one example of a humidifying means.

FIG. 6 is a schematic cross-sectional view of a cell unit that comprises a humidifying means. As shown in FIG. 6, the present invention is characterized in that as the humidifying means 2a, a water holding unit 21 comprised of a water-absorbing material is provided at a position in contact with a polymer electrolyte membrane serving as an ionic conductor to directly humidify the polymer electrolyte membrane 12 serving as the ionic conductor utilizing an capillary action using water stored in the water holding unit, and more preferably that in order to moisten the polymer electrolyte membrane more rapidly and more uniformly, a humidification water passage 28 comprised of a hydrophilic material and connected to the water holding unit is provided in the polymer electrolyte membrane. Incidentally, reference numeral 11 denotes an oxidizer electrode constituting the fuel cell, reference numeral 13 denotes a fuel electrode and reference numeral 23 denotes water generated in the oxidizer electrode. In the first embodiment, the humidification water passage has a linear shape and is provided in the polymer electrolyte membrane essentially parallel to the oxidizer electrode. Incidentally, the humidification water passage may have a flat plate shape, retiform shape or vein shape.

The present embodiment is also characterized in that in order to directly humidify the polymer electrolyte membrane by utilizing water generated in the oxidizer electrode during power generation by the fuel cell system, a water holding unit comprised of a water-absorbing material is provided at a position in contact with the oxidizer electrode and the polymer electrolyte membrane of the fuel cell system.

By disposing the water holding unit for storing water necessary for humidifying the polymer electrolyte membrane in accordance with the present invention adjacent to the polymer electrolyte membrane and using a capillary force, water can be transported without using a pump or the like and humidification in an optimum amount of the polymer electrolyte membrane can be carried out.

Further, by disposing the water holding unit not only adjacent to the polymer electrolyte membrane of the fuel cell, but at the same time also adjacent to the oxidizer electrode, the water generated in the oxidizer electrode during power generation can be used for humidification. Moreover, by directly humidifying the polymer electrolyte membrane, a humidifying means for a fuel cell system can be provided in which an oxidizer on an oxidizer electrode side and a fuel on a fuel electrode side are not mixed with each other.

Second Embodiment

A fuel cell system according to a second embodiment of the present invention is characterized by having a water-moving pattern comprising a hydrophobic region and a hydrophilic region on a surface of an oxidizer electrode and water generated in the oxidizer electrode is moved by the water-moving pattern to be eliminated.

Figure 7:
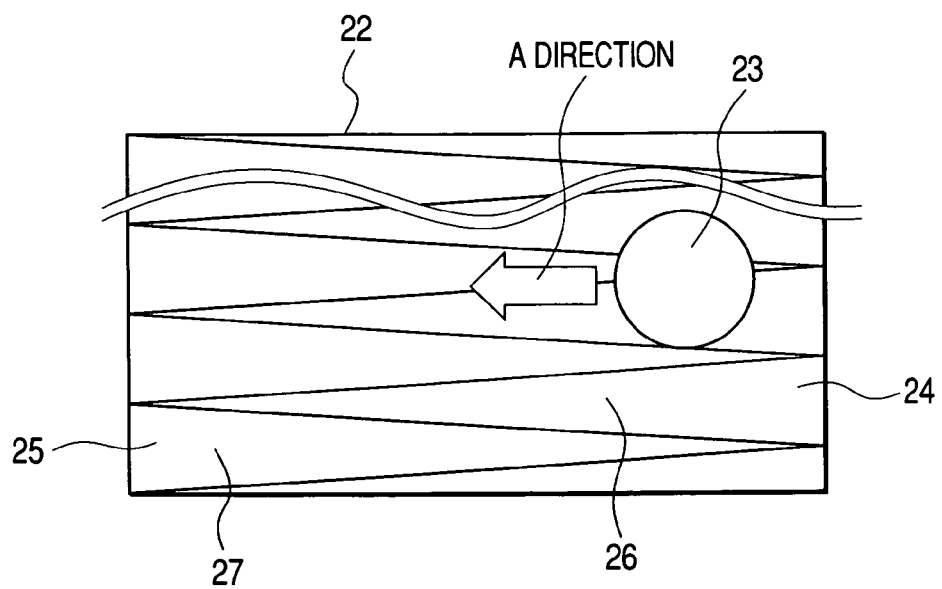
FIG. 7 is a schematic view showing a water-moving pattern provided on a surface of an oxidizer electrode.
Figure 9:
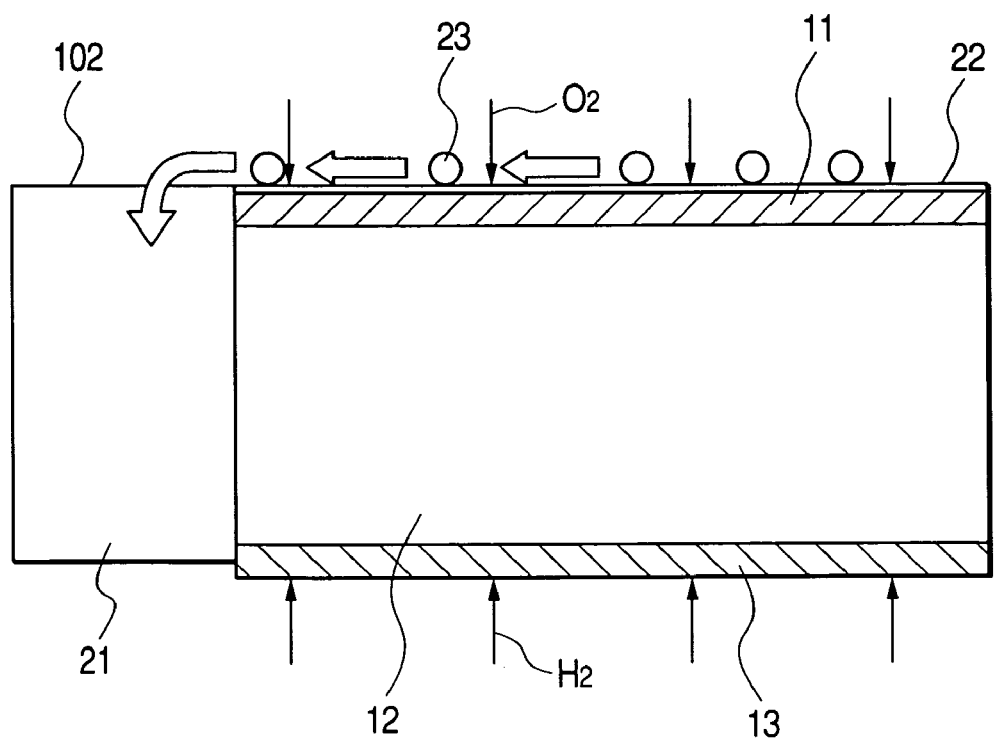
FIG. 9 is a schematic cross-sectional view showing one example of a water holding unit that stores water generated in a surface of an oxidizer electrode.

FIG. 6 is a schematic cross-sectional view of a cell unit having a humidifying means; FIG. 7 is a schematic view showing a water-moving pattern provided on a surface of an oxidizer electrode; and FIG. 9 is a schematic cross-sectional view showing one example of a water holding unit that stores water generated in a surface of an oxidizer electrode. That is, as shown in FIGS. 6, 7 and 9, in the present invention, by forming on a surface of an oxidizer electrode 11, a water-moving pattern 22 (water-moving means) comprised of a hydrophobic region 24 and a hydrophilic region 25 so that water moves in one direction, water 23 generated on the surface of the oxidizer electrode can be rapidly discharged in a given direction, without using a pump, blower or the like. Incidentally, in the figures, reference numeral 26 denotes a tapered region in which the width becomes smaller in the A-direction, reference numeral 27 denotes an oppositely tapered region in which the width becomes greater in the A-direction and reference numeral 102 denotes a water processing unit.

In addition, by disposing the water holding unit for storing the discharged water adjacent to the fuel cell, the generated water can be prevented from wetting a fuel cell system or electric equipment mounted with a fuel cell system.

Third Embodiment

A fuel cell system according to a third embodiment of the present invention will be explained in the following. The third embodiment is characterized in that as a water-moving means in place of the water-moving pattern of the second embodiment, a porous layer is provided on a surface of an oxidizer electrode of a cell unit in which the pore (hole) diameter of the porous material gradually becomes smaller in the water discharging direction, and the number of pores per unit volume (i.e. density) of the porous material gradually becomes greater in that direction. Such a porous layer allows the water generated in the oxidizer electrode to be removed.

Figure 11A:
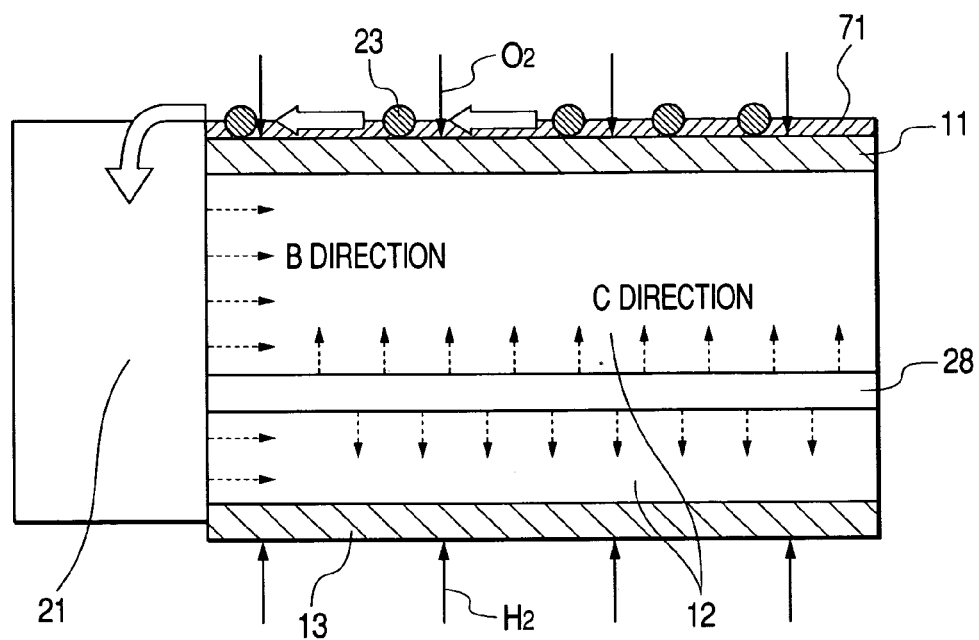
FIG. 11A is a cross-sectional view taken along line 11A-11A of FIG. 10.
Figure 11B:
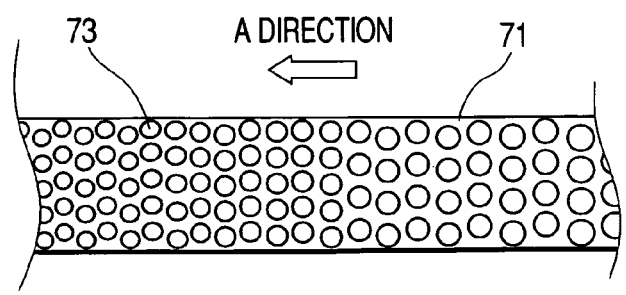
FIG. 11B is a schematic cross-sectional view of the porous layer of FIGS. 10 and 11A.

FIG. 10 is a plan view of a cell unit having on the surface of an oxidizer electrode 11, a porous layer 71 in which the pore diameter of the porous material gradually becomes smaller in the A-direction. FIG. 11A is a cross-sectional view taken along line 11A-11A of FIG. 10. FIG. 11B is a schematic cross-sectional view of the porous layer of FIGS. 10 and 11A. Incidentally, in these figures, reference numeral 73 denotes a pore (hole) that is contained in the porous layer, reference numeral 12 denotes a polymer electrolyte membrane serving as an ionic conductor, reference numeral 13 denotes a fuel electrode, reference numeral 21 denotes a water holding unit, reference numeral 23 denotes water generated in the oxidizer electrode, and reference numeral 28 denotes a humidification water passage.

In the present embodiment, as shown in FIG. 11B, by gradually decreasing the pore diameter of the pores (holes) 73 of the porous material 71 in the A-direction and increasing the density of the pore 73 in that direction, the surface area per unit volume of the porous material is gradually increased in the A-direction. Because porous materials are generally hydrophilic, the attraction to water of the porous layer becomes greater in the A-direction, so that the porous layer 71 can lead the water 23 to the water holding unit 21 in the A-direction.

When the porous material used is relatively hydrophobic, by gradually increasing the pore diameter of the porous material in the A-direction and decreasing the pore density in that direction such that the surface area per unit volume of the porous material is gradually decreased in the A-direction, the porous layer can lead the water 23 in the A-direction. This is because the attraction to water of the porous layer becomes greater in the A-direction.

Fourth Embodiment

A fuel cell system according to a fourth embodiment of the present invention will be explained in the following. The fourth embodiment is characterized in that in place of the porous layer of the third embodiment, a porous layer is provided on a surface of an oxidizer electrode of a cell unit as a water-moving means in which the thickness of the porous layer gradually becomes greater in the water discharging direction. Such a porous layer allows water generated in the oxidizer electrode to be discharged.

Figure 13:
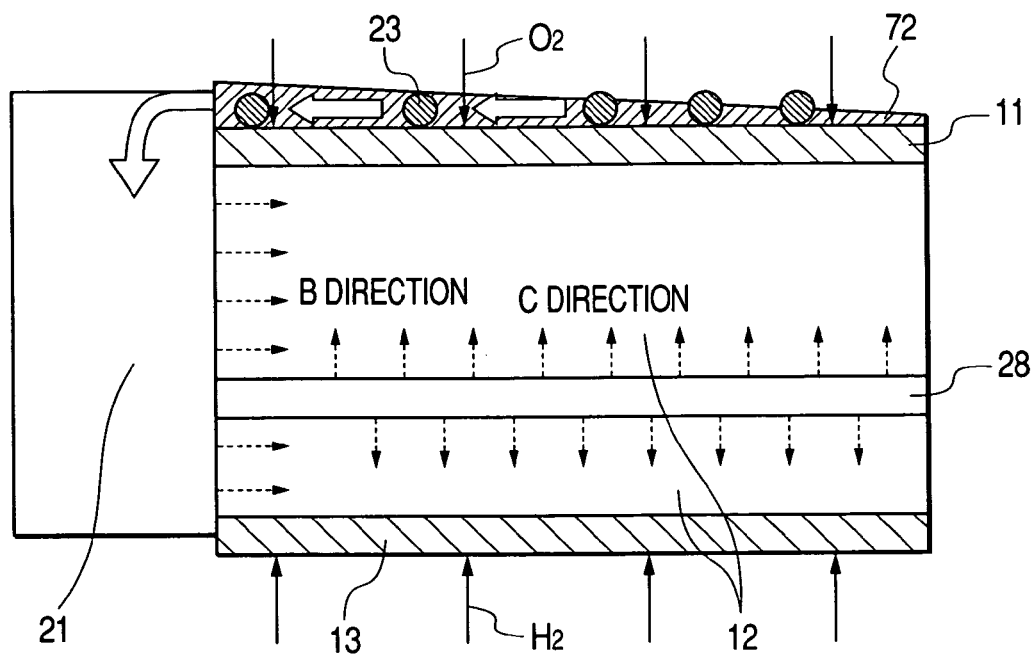
FIG. 13 is a cross-sectional view taken along line 13-13 of FIG. 12.
Figure 14:
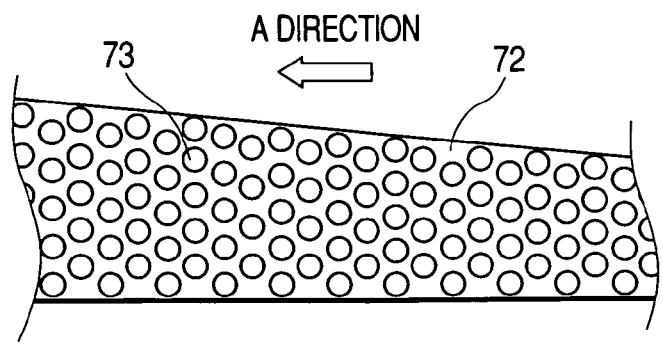
FIG. 14 is a schematic cross-sectional view of the porous layer of FIGS. 12 and 13.

FIG. 12 is a plan view of a cell unit having on a surface of an oxidizer electrode 11, a porous layer 72 the thickness of which gradually becomes greater in A-direction. FIG. 13 is a cross-sectional view taken along line 13-13 of FIG. 12. FIG. 14 is a schematic cross-sectional view of the porous layer of FIGS. 12 and 13.

In the present embodiment, the thickness of the porous layer 72 gradually becomes greater in the A-direction, so that the surface of the porous layer has an inclination that rises in the A-direction. In the present embodiment, as shown in FIG. 14, the pore diameter of pores 73 of the porous layer 72 is approximately uniform and the density of the pores 73 is also uniform. Thus, the surface area per unit area of the oxidizer electrode surface of the porous layer 72 on the surface of the oxidizer electrode gradually increases in the A-direction. Because porous materials are generally hydrophilic, the attraction to water of the porous layer becomes greater in the A-direction, so that the porous layer 72 can lead the water 23 to the water holding unit 21 in the A-direction.

When the porous material used is relatively hydrophobic, by gradually decreasing the thickness of the porous layer in the A-direction, the porous layer can lead the water 23 in the A-direction. The reason for this is that because the surface area per unit area of the porous layer becomes smaller in the A-direction, the attraction to water of the porous layer becomes greater in the A-direction.

Incidentally, it should be noted that anyone skilled in the art will have various other modifications occur to him based on the teaching of the third and fourth embodiments and these modifications are intended to be encompassed within the scope of the present invention. For example, when a porous material having pores of a uniform diameter is used, a porous layer having a pore coarseness (density) varied in the A-direction may be used. In this case, if the porous material is hydrophilic, by increasing the number of pores per unit volume (density) in the A-direction, the surface area per unit volume of the porous material increases in the A-direction, so that water can be led in the A-direction. On the other hand, if the porous material is hydrophobic, by decreasing the number of pores per unit volume in the A-direction, the surface area per unit volume of the porous material decrease in the A-direction, so that water can be led in the A-direction.

Further, as another modification, for example, a porous material may be used for a porous layer in which the pore diameter varies in the A-direction and the pore density is uniform. In this case, if the porous material is hydrophilic, by increasing the pore diameter in the A-direction, the surface area per unit volume of the porous material increases in the A-direction, so that water can be led in the A-direction. On the other hand, if the porous material is hydrophobic, by decreasing the pore diameter in the A-direction, the surface area per unit volume of the porous material decrease in the A-direction, so that water can be led in the A-direction.

The present invention will now be explained in greater detail with reference to specific examples of a small fuel cell system. However, the present invention is not restricted to small fuel cell systems, and may also be used for large fuel cell systems as well.

EXAMPLE 1

A first aspect according to the present invention will be explained in detail while referring to the drawings.

Figure 2B:
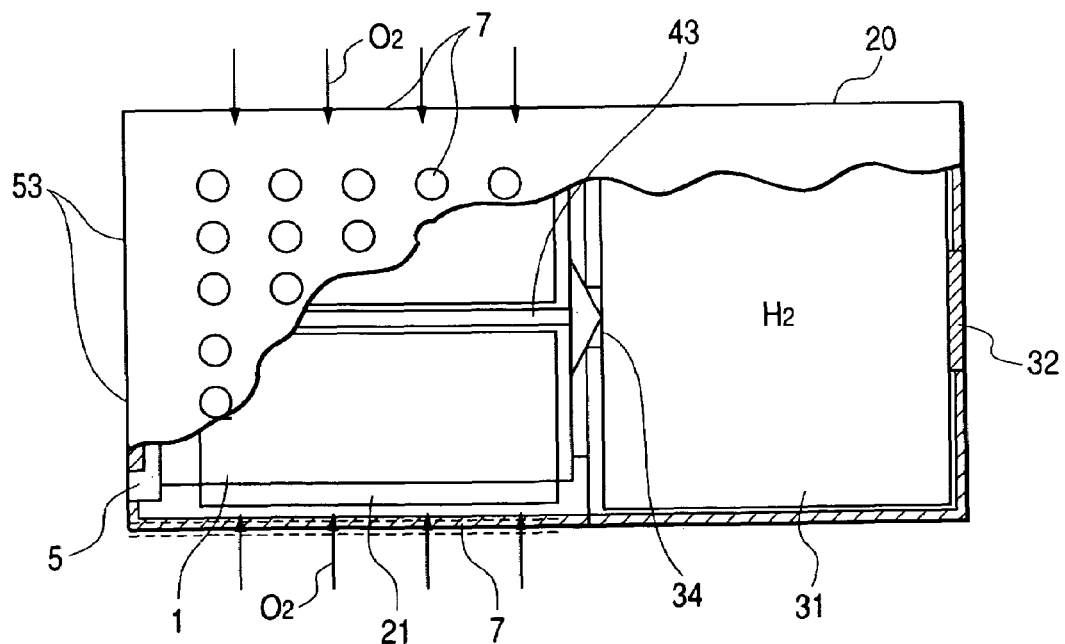
FIG. 2B is a partial cross-sectional plan view of the fuel cell system of FIG. 1.
Figure 3A:
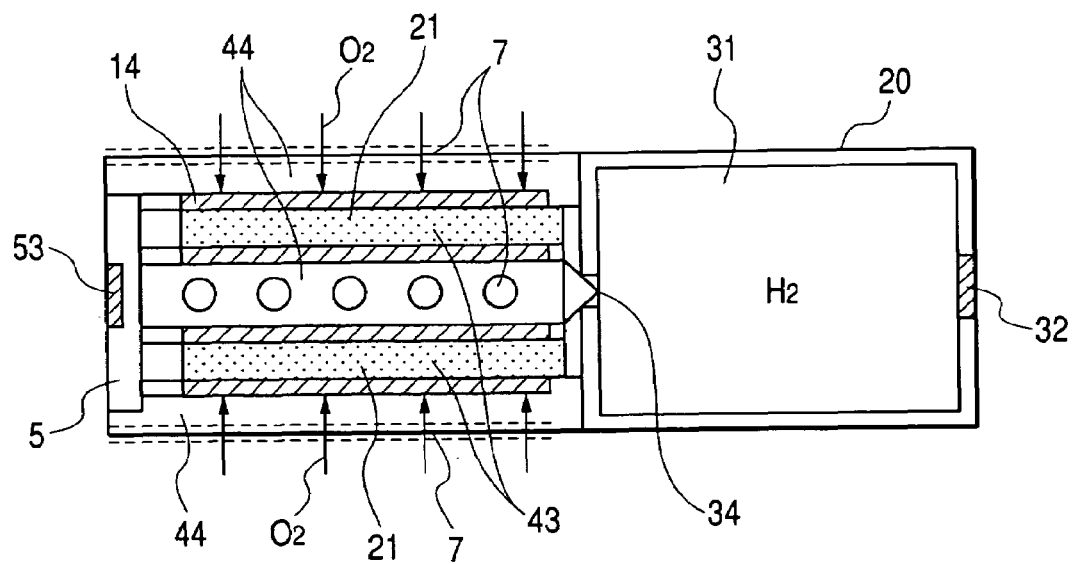
FIG. 3A is a front view of the fuel cell system of FIG. 1.
Figure 3B:
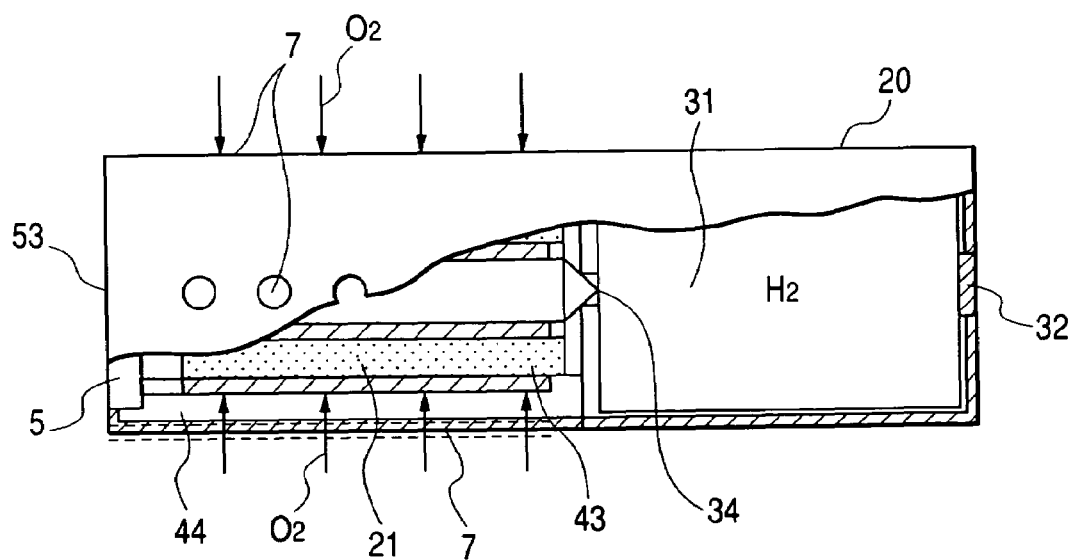
FIG. 3B is a partial cross-sectional front view of the fuel cell system of FIG. 1.
Figure 4:
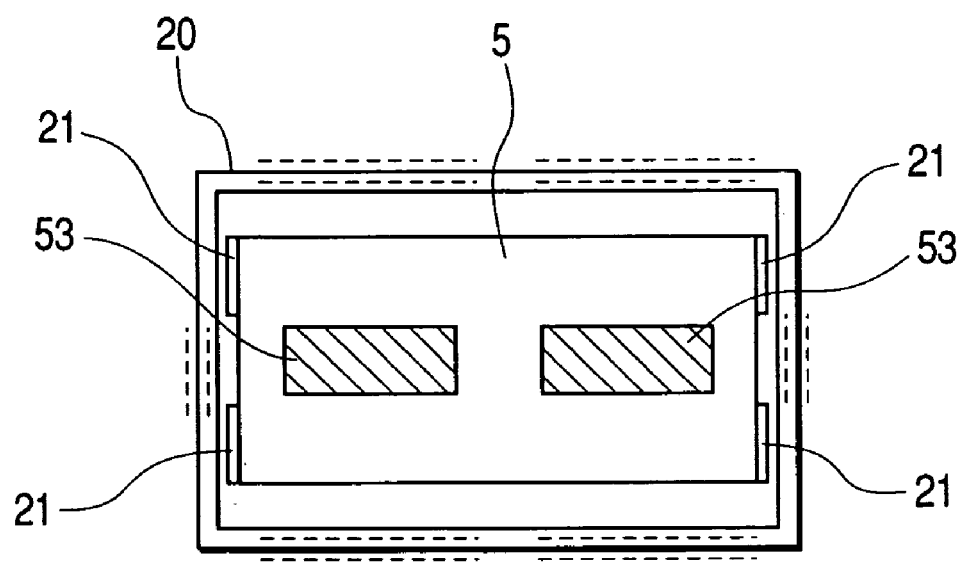
FIG. 4 is a left side view of the fuel cell system of FIG. 1.
Figure 5:
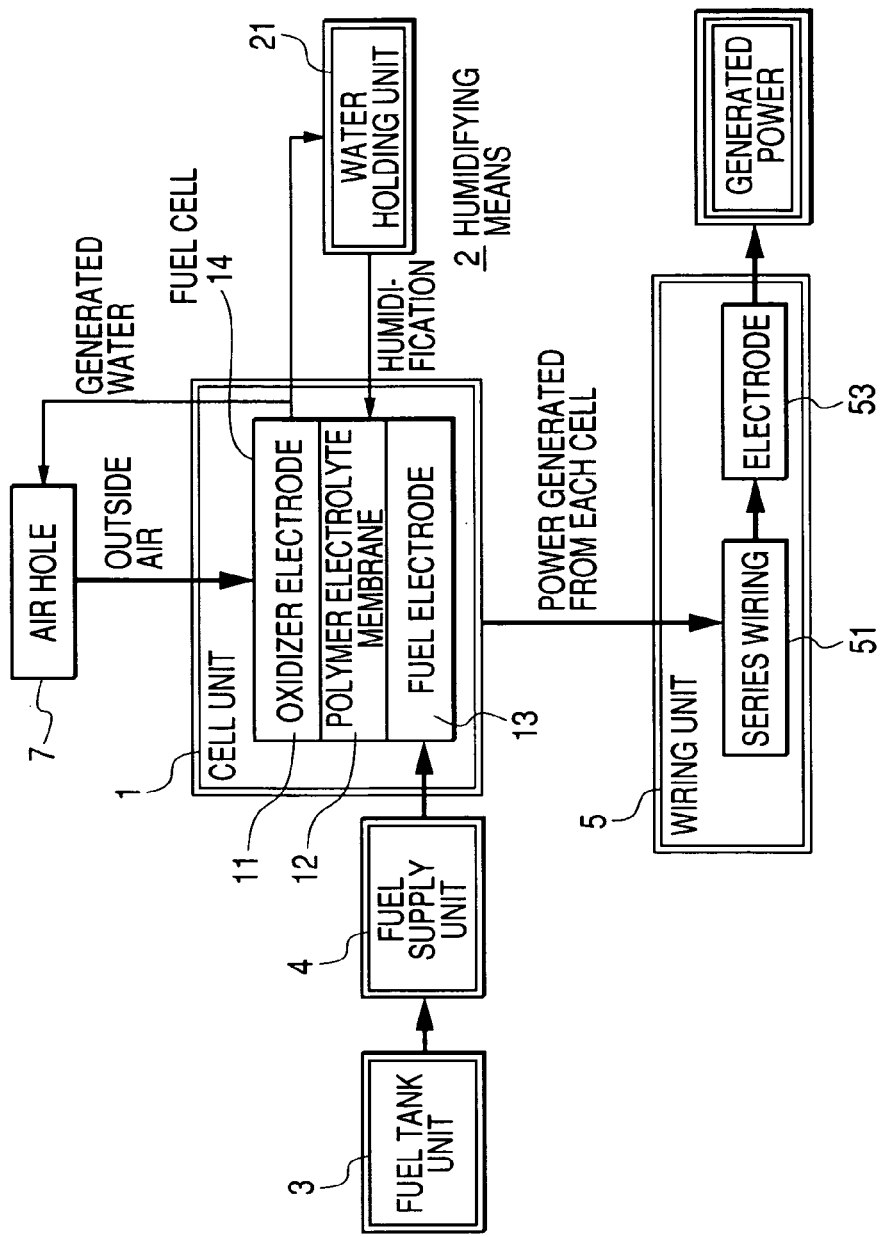
FIG. 5 is a schematic view showing a structure of the fuel cell system according to the present invention.

FIG. 1 is a perspective view illustrating a fuel cell system according to Example 1 of the present invention; FIG. 2A is a plan view of a fuel cell system of FIG. 1; FIG. 2B is a partial cross-sectional plan view of the fuel cell system of FIG. 1; FIG. 3A is a front view of the fuel cell system of FIG. 1; FIG. 3B is a partial cross-sectional front view of the fuel cell system of FIG. 1; FIG. 4 is a left side view of the fuel cell system of FIG. 1; and FIG. 5 is a schematic view showing a structure of the fuel cell system according to the present invention. FIGS. 1, 2A, 3A and 4 illustrate the interior of the fuel cell system as it might be seen through a transparent casing 20.

Giving one example of the external dimensions of a fuel cell system according to the present invention illustrated in FIG. 1, the length (a) is 30 mm, the width (b) is 50 mm and the height (c) is 10 mm. This is approximately the same size as that of a lithium ion battery used in an ordinary digital compact camera.

Figure 8:
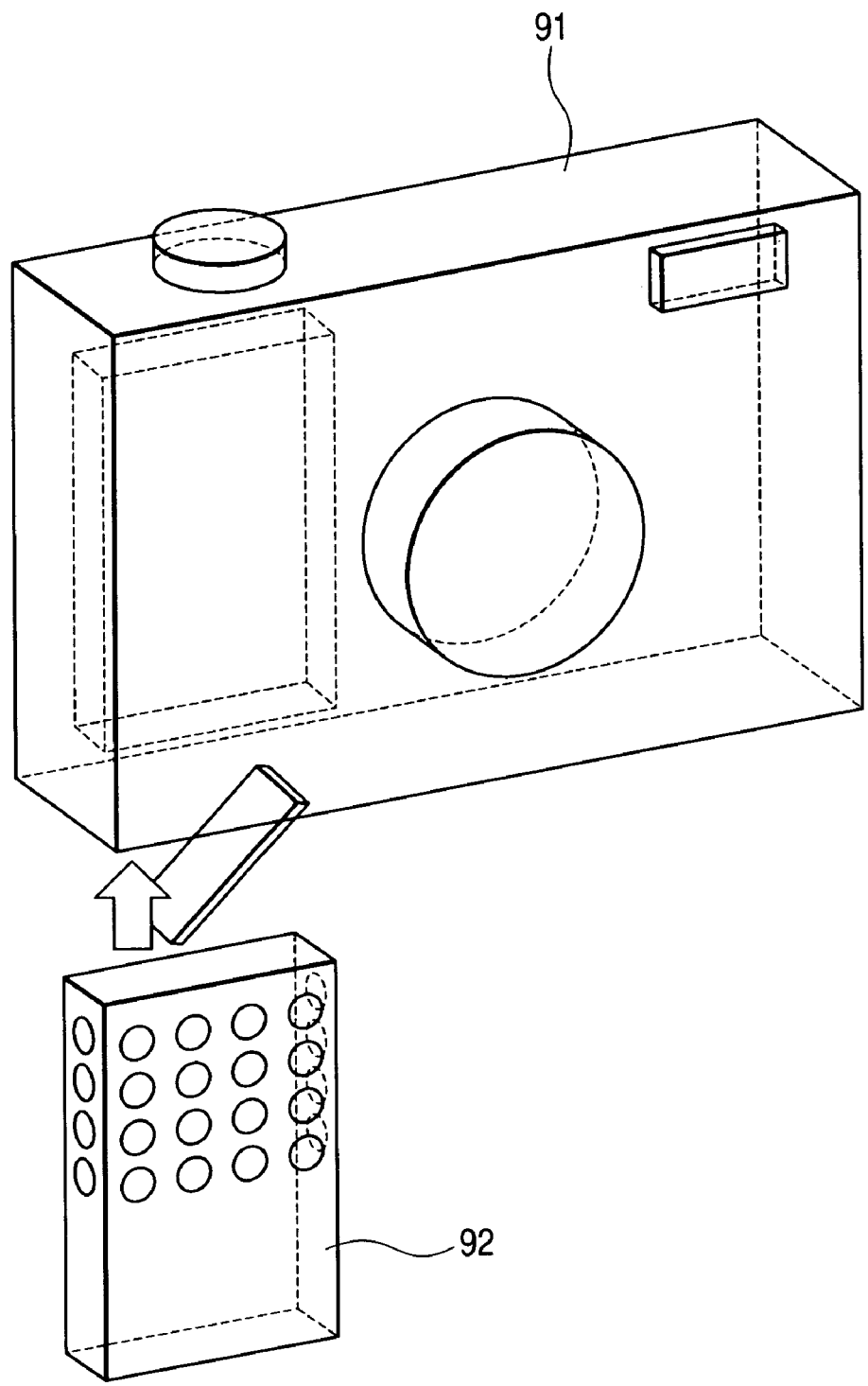
FIG. 8 is a schematic perspective view showing a digital camera that is mounted with a fuel cell system according to the present invention.

FIG. 8 is a schematic view showing one example of a digital camera that is mounted with a fuel cell system according to the present invention. As shown in FIG. 8, a digital camera 91, which is one example of the above-described small portable electric equipments, can easily incorporate a small fuel cell system 92 thereinto because it is small and integrated. Further, the thin rectangular shape of a fuel cell system as illustrated the figure is easier to incorporate into a small electric equipment than a thick rectangular or cylindrical shape.

Incidentally, the fuel cell system in accordance with the present invention has no restrictions on its size, and can be provided as a fuel cell system that can be mounted into and used in a digital camera, as well as portable small electric equipments such as digital video cameras, small projectors, small printers, notebook personal computers, etc. and that generate an electric power of several mW to several 100 W.

In FIG. 1, the fuel cell system according to the present invention is provided in a thin rectangular casing 20 with a cell unit 1 consisting of 4 fuel cells 14, a fuel tank unit 3 which stores a fuel for supplying to the cell unit 1, a fuel supply unit 4 for supplying the fuel stored in the fuel tank unit 3 to the cell unit 1, air holes 7 for supplying an oxidizer gas to the cell unit 1, and a wiring unit 5 which collects the power generated by the cell unit 1 and temporarily stores the power so that a stable power can always be supplied to the outside, wherein a water holding unit 21 which takes in water generated in the oxidizer electrode for storing is provided adjacent to the oxidizer electrode of the fuel cell 14.

The fuel cell system according to the present invention has air holes 7 for taking in outside air at an upper surface 82, a lower surface 81 and longer side surfaces 84a, 84b of the casing 20 in order to take in oxygen as an oxidizer gas for use in the reaction. Further, these air holes 7 also play a role of allowing the water generated to escape as water vapor. However, when the fuel cell system is used in an electric equipment that is less resistant to moisture intrusion, moisture is blocked from being released to the outside by means of adhering to the air holes 7 a film that allows only air to pass through and blocks water vapor, or the like.

Further, the wiring unit 5 is provided on one shorter side surface 83b of the casing 20, wherein an terminal 53 is provided on the wiring unit 5 for taking out a power. Moreover, on the other shorter side surface 83a of the casing 20, a fuel feed port 32 is provided.

The interior of the casing 20 is constituted of a cell unit 1 consisting of at least one fuel cell 14 (refer to FIG. 5) each consisting of a fuel electrode 13, a polymer electrolyte membrane 12 which serves as an ionic conductor, an oxidizer electrode 11, and a catalyst, a water holding unit 21 acting as a humidifying means 2 which stores surplus water generated in the oxidizer electrode and supplies the water to the polymer electrolyte membrane 12, a fuel tank unit 3 for storing a fuel, a fuel supply unit 4 which lowers the pressure of the fuel supplied from the fuel tank unit and leading the fuel to the fuel electrode of each cell and a wiring unit 5 which collects the electricity generated in each fuel cell 14.

FIG. 5 is a schematic view showing a structure of the fuel cell system according to the present invention as shown in FIG. 1. In the figure, a fuel housed in the fuel tank unit 3 passes through the fuel supply unit 4 from the fuel tank unit 3 and is supplied to the fuel electrode 13 of the fuel cell 14 of the cell unit 1. Air (outside air) is used as an oxidizer gas and passes through the air holes 7 and is supplied to the oxidizer electrode 11 of the fuel cell 14. The cell unit 1 consists of at least one fuel cell 14, and each fuel cell 14 is constituted of a fuel electrode 13, a polymer electrolyte membrane 12, an oxidizer electrode 11 and a catalyst. A power generated in each fuel cell 14 by supplying the fuel from the fuel tank unit 3 and the oxidizer gas from the outside air is temporarily stored by the wiring unit 5 to allow a stable generated power to be always supplied to the outside from the terminal 53. In the power generation using this fuel cell, hydrogen ions that have been generated in the fuel electrode 13 pass through the polymer electrolyte membrane 12 and react with the oxidizer (oxygen) in the oxidizer electrode, thereby generating water at the surface of the oxidizer electrode 11. While a part of the generated water evaporates to the outside through the air holes 7, the remaining surplus generated water moves from the surface of the oxidizer electrode and is stored in the water holding unit 21 of the humidifying means 2. Further, the water stored in the humidifying means 2 is supplied to the polymer electrolyte membrane 12 to humidify the membrane.

Next, the humidifying means used in the present invention will be explained.

FIG. 6 is a schematic view showing one example of the humidifying means, and FIG. 7 is a schematic view showing a water-moving pattern provided on a surface of the oxidizer electrode.

As shown in FIG. 6, in the fuel cell according to the present invention, hydrogen ions generated in the fuel electrode 13 pass through the polymer electrolyte membrane 12 and react with the oxidizer (oxygen) in the oxidizer electrode 11, thereby generating water 23 on the surface of the oxidizer electrode 11. If this water 23 is not rapidly removed and dealt with, there is a fear that the oxidizer gas (oxygen) could not be supplied to the oxidizer electrode 11, and further that a small electric equipment containing the fuel cell system could be wetted.

On the other hand, the polymer electrolyte membrane 12 according to the present invention needs to be suitably moist during the reaction. The present invention has resolved this problem by humidifying the polymer electrolyte membrane by effectively using the water generated in the reaction by use of a humidifying means 2. In particular, humidification is performed using a structure in which the water holding unit 21 for absorbing the water 23 generated on the surface of the oxidizer electrode 11 and carrying out humidification is placed in contact with side surfaces of the oxidizer electrode 11 and the polymer electrolyte membrane 12.

Such a construction first stores the water 23 generated by the reaction in the water holding unit 21. This water holding unit 21 is in contact with the polymer electrolyte membrane 12, and water moves by a capillary action in the B-direction, so that the polymer electrolyte membrane can be directly and suitably wetted. In a small fuel cell system, because the distance from the water holding unit to a central part of the polymer electrolyte membrane is very small (usually 10 cm or less), the moisture supplied from the water holding unit utilizing the capillary action can sufficiently and uniformly humidify the polymer electrolyte membrane only by natural diffusion.

In cases where the area of the cell is large and uniform and rapid humidification only by natural diffusion is difficult, disposing in the polymer electrolyte membrane 12 at least one humidification water passage 28 comprised of a hydrophilic material and connected to the water holding unit allows water to move in the C-direction, so that the polymer electrolyte membrane 12 can sufficiently be humidified with water which moves in the B-direction and the C-direction without using an apparatus such as a pump. According to this method, since the polymer electrolyte membrane can be humidified without mixing of the oxidizer of the oxidizer electrode with the fuel of the fuel electrode, and since no apparatus such as a pump for water transportation is needed, the fuel cell system can be made compact and lightweight.

Moreover, in the present invention, as illustrated in FIG. 7, by providing a water-moving pattern 22 consisting of a hydrophobic region 24 and a hydrophilic region 25 on the surface of the oxidizer electrode 11 as a water-moving means, the water 23 generated in the oxidizer electrode can be moved by this water-moving pattern 22 and housed in the water holding unit 21. The hydrophobic region 24 is formed of a tapered region 26 whose width decreases in the A-direction, while the hydrophilic region 25 is formed of an oppositely tapered region 27 whose width increases in the A-direction, and the tapered region 26 and the oppositely tapered region 27 are arranged alternatively. Water droplets will move in a direction of a lower energy state. Therefore, in FIG. 7, water droplets will move in the A-direction from the right-hand side where the hydrophobic region 24 is wider to the left-hand side where the hydrophilic region 25 is wider. That is, the generated water can be moved in a given direction utilizing the patterning of the hydrophilic and hydrophobic regions.

Incidentally, the taper (the manner of decrease or increase in the width) of the tapered region 26 and the oppositely tapered region 27 is not restricted to the straight lines as shown in the figure, and may be any shape such as a curve, a staircase (stepped shape) and the like as long as the above-mentioned moving effect can be exhibited.

The respective hydrophobic and hydrophilic pattern materials include, for example, compounds containing fluorine in a side chain as the hydrophobic material, and as the hydrophilic material, compounds having a hydroxyl group, carboxyl group or ether group in a side chain. The method for forming the pattern includes, for example, a method in which the oxidizer electrode is masked in a tapered shape, and then a hydrophobic or hydrophilic material is applied by spraying.

As described above, by disposing a water holding unit 21 comprised of a water-absorbing material at the destination of water, the discharged water can be taken in and stored.

The material for the water holding unit used in the present invention includes water-absorbing substances, which may be organic or inorganic substances. The organic substances include polymers having a hydrophilic group such as an acrylic group, an amide group, an ether group, or a carboxyl group, for example polyacrylamide gel. On the other hand, the inorganic substances include silica gel and zeolite. A method of disposing the water holding unit on a side surface of the fuel cell includes, for example, fixing a vessel for supporting a water holding material on a side surface of the fuel cell system and putting the water holding material in the vessel.

The material for the humidification water passage used in the present invention may be a hydrophilic material, for example, an organic substance such as a styrene based compound having a sulfonic acid group in a side chain, and an inorganic substance prepared by adding a phosphoric acid group to a silica sol-gel. The styrene based compound having a sulfonic acid group in a side chain and the compound prepared by adding a phosphoric acid group to a silica sol-gel are preferred because they have an ionic conductive and can conduct ions to contribute to power generation. A method of arranging a humidification water passage in the polymer electrolyte membrane includes, for example, sandwiching the humidification water passage by the polymer electrolyte membranes.

Further, as the polymer electrolyte membrane serving as an ionic conductor, those materials may be used into which water can penetrate by a capillary action, such as a perfluorosulfonic acid based polymer, for example, Nafion (trade name; manufactured by Dupont).

The fuel cell according to the present example produces an electromotive force of 0.8 V and a current density of 300 mA/cm$^2$ and the size of a unit cell is 1.2 cm×2 cm. By connecting 8 of these fuel cells in series, an output of the whole cell system of 4.6 W is obtained at 6.4 V and 720 mA.

EXAMPLE 2

The second aspect of the present invention will be explained in detail while referring to the drawings. Example 2 is a fuel cell system that comprises a cell unit having a water-moving pattern (water-moving means) provided on a surface of an oxidizer electrode, and is of a configuration such that no humidification water passage is provided. Example 2 is the same as Example 1 with the exception that no humidification water passage is provided. FIG. 1 is a perspective view illustrating a fuel cell system in accordance with Example 2 of the present invention. FIG. 2 is plan views of the fuel cell system of FIG. 1. FIG. 3 is front views of the fuel cell system of FIG. 1. FIG. 4 is a left side view of the fuel cell system of FIG. 1. FIG. 5 is a schematic view showing a structure of a fuel cell system according to the present invention.

Giving one example of the external dimensions of a fuel cell system according to the present example illustrated in FIG. 1, the length (a) is 30 mm, the width (b) is 50 mm and the height (c) is 10 mm. This is approximately the same size as that of a lithium ion battery used in an ordinary digital compact camera.

FIG. 8 is a schematic view showing one example of a digital camera that is mounted with a fuel cell system according to the present invention. As shown in FIG. 8, a digital camera 91, which is one example of the small portable electric equipments as the use of the present invention, can easily incorporate a small fuel cell system 92 thereinto because it is small and integrated. Further, the thin rectangular shape of a fuel cell system as illustrated the figure is easier to incorporate into a small electric equipment than a thick rectangular or cylindrical shape.

Incidentally, the fuel cell system in accordance with the present invention has no restrictions on its size, and can be provided as a fuel cell system that can be applied to and used in a digital camera, as well as portable small electric equipments such as digital video cameras, small projectors, small printers, notebook personal computers, etc. and that generate an electric power of several mW to several 100 W.

In FIG. 1, the fuel cell system according to the present invention is provided in a thin rectangular casing 20 with a cell unit 1 consisting of 4 fuel cells 14, a fuel tank unit 3 which stores a fuel for supplying to the cell unit 1, a fuel supply unit 4 for supplying the fuel stored in the fuel tank unit 3 to the cell unit 1, air holes 7 for supplying an oxidizer gas to the cell unit 1, and a wiring unit which collects the power generated by the cell unit 1 and temporarily stores the power so that a stable power can always be supplied to the outside, wherein a water holding unit 21 which stores water generated in the oxidizer electrode and discharged therefrom is provided adjacent to the oxidizer electrode of the fuel cell 14.

The fuel cell system according to the present invention has air holes 7 for taking in outside air at an upper surface 82, a lower surface 81 and longer side surfaces 84a, 84b of the casing 20 in order to take in oxygen as an oxidizer gas for use in the reaction. Further, these air holes 7 also play a role of allowing the water generated to escape as water vapor. However, when the fuel cell system is used in an electric equipment that is less resistant to moisture intrusion, moisture is blocked from being released to the outside by means of adhering to the air holes 7 a film that allows only air to pass through and blocks water vapor, or the like.

Further, the wiring unit 5 is provided on one shorter side surface 83b of the casing 20, wherein an terminal 53 is provided on the wiring unit 5 for taking out a power.

The interior of the casing 20 is constituted of a cell unit 1 consisting of at least one fuel cell 14 (refer to FIG. 5) each consisting of a fuel electrode 13, a polymer electrolyte membrane 12 which serves as an ionic conductor, an oxidizer electrode 11, and a catalyst, a water holding unit 21 which takes in and stores water generated in the oxidizer electrode, a fuel tank unit 3 for storing a fuel, a fuel supply unit 4 which lowers the pressure of the fuel supplied from the fuel tank unit and leading the fuel to the fuel electrode of each cell and a wiring unit 5 which collects the electricity generated in each fuel cell 14.

FIG. 5 is a schematic view showing a structure of the fuel cell system according to the present invention as shown in FIG. 1. In the figure, a fuel housed in the fuel tank unit 3 passes through the fuel supply unit 4 from the fuel tank unit 3 and is supplied to the fuel electrode 13 of the fuel cell 14 of the cell unit 1. Air (outside air) is used as an oxidizer gas and passes through the air holes 7 and is supplied to the oxidizer electrode 11 of the fuel cell 14. The cell unit 1 consists of at least one fuel cell 14, and each fuel cell 14 is constituted of a fuel electrode 13, a polymer electrolyte membrane 12, an oxidizer electrode 11 and a catalyst. A power generated in each fuel cell 14 by supplying the fuel from the fuel tank unit 3 and the oxidizer gas from the outside air is temporarily stored by the wiring unit 5 to allow a stable generated power to be always supplied to the outside from the terminal 53. In the power generation using this fuel cell, hydrogen ions that have been generated in the fuel electrode 13 pass through the polymer electrolyte membrane 12 and react with the oxidizer (oxygen) in the oxidizer electrode, thereby generating water at the surface of the oxidizer electrode 11. While a part of the generated water evaporates to the outside through the air holes 7, the remaining surplus generated water moves by means of the water-moving pattern comprising a hydrophobic region and a hydrophilic region provided on the surface of the oxidizer electrode and is stored in the water holding unit 21 of the water processing unit 102. Further, the water stored in the water processing unit 102 may be supplied to the polymer electrolyte membrane 12 to humidify the membrane.

Next, the water holding unit for taking in and storing water generated on the surface of the oxidizer electrode according to Example 2 will be explained.

FIG. 9 is a schematic view showing one example of a water holding unit for storing water generated on a surface of an oxidizer electrode, and FIG. 7 is a schematic view showing a water-moving pattern provided on a surface of an oxidizer electrode.

As shown in FIG. 9, in the fuel cell according to Example 2, hydrogen ions generated in the fuel electrode 13 pass through the polymer electrolyte membrane 12 and react with the oxidizer (oxygen) in the oxidizer electrode 11, thereby generating water 23 on the surface of the oxidizer electrode 11. If this water 23 is not rapidly removed and dealt with, there is a fear that the oxidizer gas (oxygen) could not be supplied to the oxidizer electrode 11, and further that a small electric equipment containing the fuel cell system could be wetted.

For this reason, in Example 2, as illustrated in FIG. 7, by providing a water-moving pattern 22 consisting of a hydrophobic region 24 and a hydrophilic region 25 on the surface of the oxidizer electrode 11, the water 23 generated in the oxidizer electrode can be moved by this water-moving pattern 22 to be discharged. As described above, the hydrophobic region 24 is formed of a tapered region 26, while the hydrophilic region 25 is formed of an oppositely tapered region 27, and the tapered region 26 and the oppositely tapered region 27 are arranged alternatively. Water droplets will move in a direction of a lower energy state. Therefore, in FIG. 7, water droplets will move in the A-direction from the right-hand side where the hydrophobic region 24 is wider to the left-hand side where the hydrophilic region 25 is wider. That is, the generated water can be moved in a given direction utilizing the patterning of the hydrophilic and hydrophobic regions. Incidentally, it will be apparent to one skilled in the art that also in the present example, the shape of the taper is not limited to what is illustrated in the figures as with the above description.

The respective hydrophobic and hydrophilic pattern materials include, for example, compounds containing fluorine in a side chain as the hydrophobic material, and as the hydrophilic material, compounds having a hydroxyl group, carboxyl group or ether group in a side chain. The method for forming the pattern includes, for example, a method in which the oxidizer electrode is masked in a tapered shape, and then a hydrophobic or hydrophilic material is applied by spraying.

By disposing a water holding unit 21 comprised of a water-absorbing material at the destination of water, the discharged water can be taken in and stored. In particular, disposing the water holding unit 21 on a side surface of the fuel cell while being in contact with the oxidizer electrode 11 eliminates obstruction to the passage for supplying the oxidizer (outside air) to the oxidizer electrode. This construction allows the water generated by the reaction to be rapidly removed from the surface of the oxidizer electrode, also allows the discharged water to be guided to the water holding unit and further allows the surplus water to be stored in the water holding unit.

The material for the water holding unit used in the present invention includes water-absorbing substances, which may be organic or inorganic substances. The organic substances include polymers having a hydrophilic group such as an acrylic group, an amide group, an ether group, or a carboxyl group, for example polyacrylamide gel. On the other hand, the inorganic substances include silica gel and zeolite. A method of disposing the water holding unit on a side surface of the fuel cell includes, for example, fixing a vessel for supporting a water holding material on a side surface of the fuel cell system and putting the water holding material in the vessel.

The fuel cell according to the present example produces an electromotive force of 0.8 V and a current density of 300 mA/cm$^2$ and the size of a unit cell is 1.2 cm×2 cm. By connecting 8 of these fuel cells in series, an output of the whole cell system of 4.6 W is obtained at 6.4 V and 720 mA.

The fuel cell system according to the present invention may be mounted and used in an electric equipment which may be either small or large. Further, the fuel cell system according to the present invention is preferably a polymer electrolyte fuel cell system, in particular a polymer electrolyte small fuel cell system, which can preferably be mounted and used in portable small electric equipments such as a digital camera, a digital video camera, a printer, or the like.

While the present invention has been particularly shown and described with reference to the fuel cell system of the type in which hydrogen is supplied to the fuel electrode, it will be understood by those skilled in the art that the present invention is not limited to the type using such a gaseous fuel and can also be applied to a fuel cell system of a type in which a liquid fuel such as methanol or chemical hydride is supplied to a fuel electrode.

INDUSTRIAL APPLICABILITY

As described above, according to the first aspect of the present invention, a novel fuel cell system can be provided for moistening an ionic conductor, which can simplify the system and allows the ionic conductor to be directly humidified, without use of an apparatus such as a pump used to moisten a fuel in the conventional systems.

Further, the present invention, by directly humidifying the ionic conductor, can provide a polymer electrolyte fuel cell system that can be preferably mounted on a portable small electric equipment.

Moreover, the present invention can provide a small or large electric equipment that uses the above-described fuel cell system.

According to the second aspect of the present invention, water formed in the oxidizer electrode of the fuel cell system can be easily discharged, and the discharged water can be guided to and stored in a water holding unit.

Further, with the fuel cell system of the present invention, because an apparatus such as a pump or blower is not used to discharge water, unnecessary electric power is not used within the cell system, and the system can be simplified, so that a fuel cell system can be provided which is preferably mountable on a portable small electric equipment.

Moreover, when mounted on a small electric equipment, it is possible to effectively prevent the interior of the small electric equipment from being wetted by water generated in the fuel cell system.

In addition, a small or large electric equipment can also be provided which uses the above-described fuel cell system.

The invention claimed is:

1. A fuel cell system comprising:
    a fuel cell unit comprising an oxidizer electrode, a fuel electrode, catalyst layers, and an ionic conductor provided between the oxidizer electrode and the fuel electrode; and
    means for moving water generated in the oxidizer electrode, the means for moving water comprising a hydrophilic porous layer provided on an outer surface of the fuel cell unit and in contact with an oxidizer electrode,
    wherein a surface area of the hydrophilic porous layer gradually increases in a direction in which water generated in the oxidizer electrode is to be moved.

2. The fuel cell system according to claim 1, wherein a pore diameter of a porous material of the hydrophilic porous layer gradually decreases in the direction in which water generated in the oxidizer electrode is to be moved and a pore density gradually increases in the direction.

3. The fuel cell system according to claim 1, wherein a pore diameter of a porous material of the hydrophilic porous layer is uniform, and a pore density gradually increases in the direction in which water generated in the oxidizer electrode is to be moved.

4. The fuel cell system according to claim 1, wherein a pore diameter of a porous material of the hydrophilic porous layer gradually increases in the direction in which water generated in the oxidizer electrode is to be moved and a pore density is uniform.

5. The fuel cell system according to claim 1, wherein a thickness of the porous layer gradually increases in the direction in which water generated in the oxidizer electrode is to be moved.

6. The fuel cell system according to claim 1, wherein a water holding unit for storing water moved by the means for moving water is provided adjacent to the oxidizer electrode.

7. The fuel cell system according to claim 6, wherein the water holding unit is provided on a side surface of the fuel cell unit.

8. The fuel cell system according to claim 1, wherein the ionic conductor is a polymer electrolyte membrane.

9. The fuel cell system according to claim 1, which is a polymer electrolyte fuel cell system.

10. The fuel cell system according to claim 1, which is a polymer electrolyte small fuel cell system.

11. An electric equipment comprising the fuel cell system as set forth in claim 1.

12. A fuel cell system comprising:
    a fuel cell unit comprising an oxidizer electrode, a fuel electrode, and an ionic conductor provided between the oxidizer electrode and the fuel electrode; and
    means for moving water generated in the oxidizer electrode provided on a surface of the oxidizer electrode and comprising a hydrophobic porous layer,
    wherein a surface area of the hydrophobic porous layer gradually decreases in a direction in which water generated in the oxidizer electrode is to be moved.

13. The fuel cell system according to claim 12, wherein a pore diameter of a porous material of the hydrophobic porous layer gradually increases in the direction in which water generated in the oxidizer electrode is to be moved and a pore density gradually decreases.

14. The fuel cell system according to claim 12, wherein a pore diameter of a porous material of the hydrophobic porous layer is uniform and a pore density gradually decreases in the direction in which water generated in the oxidizer electrode is to be moved.

15. The fuel cell system according to claim 12, wherein a pore diameter of a porous material of the hydrophobic porous layer gradually decreases in the direction in which water generated in the oxidizer electrode is to be moved and a pore density is uniform.

16. The fuel cell system according to claim 12, wherein a thickness of the porous layer gradually decreases in the direction in which water generated in the oxidizer electrode is to be moved.

17. The fuel cell system according to claim 12, wherein a water holding unit for storing water moved by the means for moving water is provided adjacent to the oxidizer electrode.

18. The fuel cell system according to claim 17, wherein the water holding unit is provided on a side surface of the fuel cell unit.

19. The fuel cell system according to claim 12, wherein the ionic conductor is a polymer electrolyte membrane.

20. The fuel cell system according to claim 12, which is a polymer electrolyte fuel cell system.

21. The fuel cell system according to claim 12, which is a polymer electrolyte small fuel cell system.

22. An electric equipment comprising the fuel cell system as set forth in claim 12.

* * * * *